United States Patent
You

(10) Patent No.: US 8,478,249 B2
(45) Date of Patent: Jul. 2, 2013

(54) MOBILE DEVICE AND COMMUNICATION METHOD THEREOF

(75) Inventor: Qiang You, Shenzhen (CN)

(73) Assignees: Fu Tai Hua Industry (Shenzhen) Co., Ltd., Shenzhen (CN); Hon Hai Precision Industry Co., Ltd., New Taipei (TW)

(*) Notice: Subject to any disclaimer, the term of this patent is extended or adjusted under 35 U.S.C. 154(b) by 32 days.

(21) Appl. No.: 13/286,156

(22) Filed: Oct. 31, 2011

(65) Prior Publication Data

US 2013/0102289 A1    Apr. 25, 2013

(30) Foreign Application Priority Data

Oct. 24, 2011   (CN) .......................... 2011 1 0325624

(51) Int. Cl.
*H04M 3/42* (2006.01)

(52) U.S. Cl.
USPC ...................... 455/414.1; 379/87; 379/207.16

(58) Field of Classification Search
USPC ............... 455/414.1–414.4, 415, 422.1, 458, 455/550.1, 566, 567
See application file for complete search history.

(56) References Cited

U.S. PATENT DOCUMENTS

| | | | |
|---|---|---|---|
| 2007/0173236 A1* | 7/2007 | Vishwanathan et al. | ... 455/414.1 |
| 2007/0211872 A1* | 9/2007 | Cai et al. | ... 379/142.01 |
| 2010/0054428 A1* | 3/2010 | Wang et al. | ... 379/87 |
| 2012/0250847 A1* | 10/2012 | Wang et al. | ... 379/207.16 |

\* cited by examiner

*Primary Examiner* — Kashif Siddiqui

(74) *Attorney, Agent, or Firm* — Altis Law Group, Inc.

(57) ABSTRACT

A communication device initiates a telephone call to a called party by dialing a telephone number, detects whether the communication device receives a ringback tone from the called party, displays a variety of application icons for users to make a section if the communication device receives a ringback tone from the called party, and runs a selected application. A related method is also provided.

2 Claims, 2 Drawing Sheets

MOBILE DEVICE AND COMMUNICATION METHOD THEREOF

BACKGROUND

1. Technical Field

The present disclosure relates to a mobile device and a communication method thereof.

2. Description of Related Art

Typically, after a call has been initiated using a mobile phone, the caller user needs to wait for the called party to answer the call. During the waiting time, the mobile phone only displays a calling interface, thus the user cannot view any interface or input any information into the mobile phone. It would be desired that the user can utilize this time to perform different tasks on the mobile phone.

BRIEF DESCRIPTION OF THE DRAWINGS

The components of the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Figure 1:
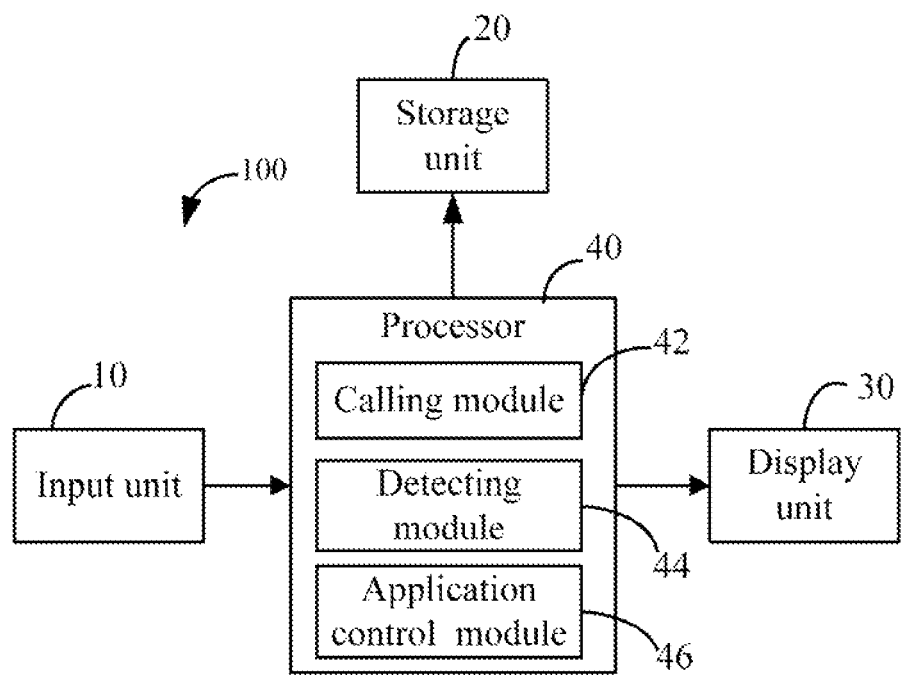
FIG. 1 is a block diagram of a mobile device in accordance with an exemplary embodiment.

Referring to FIG. 1, an embodiment of a communication device 100 is illustrated. The device 100 may be a mobile phone. The device 100 includes an input unit 10, a storage unit 20, a display unit 30, and a processor 40. The input unit 10 is for users to input commands, for example, a telephone number, to the device 100. The storage unit 20 stores a variety of files, for example, image files, audio files, and/or video files.

The processor 40 includes a calling module 42, a detecting module 44, and an application control module 46. The calling module 42 initiates a call to a called party by dialing a number input through the input unit 10. The detecting module 44 detects whether the device 100 receives a ringback tone from the called party. When a communication is established between the device 100 and the called party, the device 100 receives a ringback tone from the called party. The application control module 46 displays a number of application icons on the display unit 30 for a user to make a selection if the device 100 receives the ringback tone from the called party, and runs a selected application. The device 100 can run the selected application to play/display one or more selected files, for example, display an image. The detecting module 44 further detects whether the called party answers or hangs up the call within a preset period. The application control module 46 further closes the running application if the called party answers or hangs up the call within the preset period.

Figure 2:
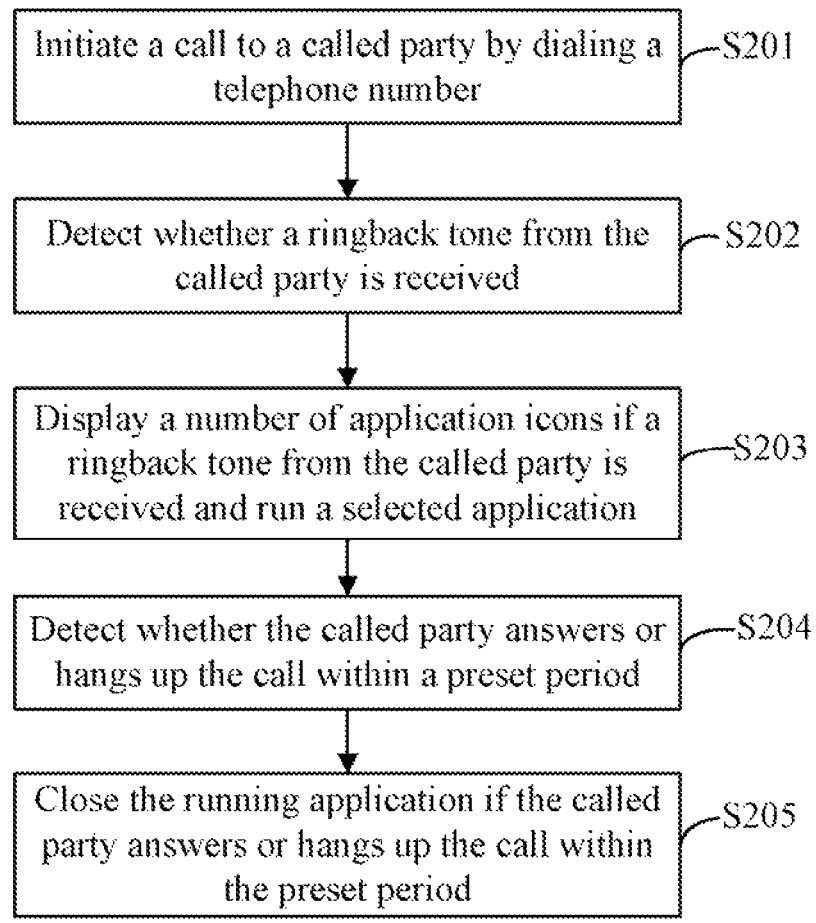
FIG. 2 is a flowchart of a communication method in accordance with an exemplary embodiment.

Referring to FIG. 2, in step S201, the device 100 initiates a call to a called party by dialing a number.

In step S202, the detecting module 44 detects whether the device 100 receives a ringback tone from the called party.

In step S203, the application control module 46 displays a number of application icons on the display unit 30 for a user to make a section if the device 100 receives the ringback tone from the called party, and runs a selected application.

In step S204, the detecting module 44 detects whether the called party answers or hangs up the call within a preset period.

In step S205, the application control module 46 closes the running application if the called party answers or hangs up the call within the preset period.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A communication device comprising:
    an input unit;
    a display unit; and
    a processor to initiate a telephone call to a called party by dialing a telephone number input through the input unit, detect whether the communication device receives a ringback tone from the called party, display a plurality of application icons on the display unit for a user to make a selection if the communication device receives a ringback tone from the called party, and run a selected application, and further to detect whether the called party answers or hangs up the call within a preset period, and close the running application if the called party answers or hangs up the telephone call within the preset period.

2. A communication method applied in a communication device, the method comprising:
    initiating a telephone call to a called party by dialing a telephone number;
    detecting whether the communication device receives a ringback tone from the called party;
    displaying a plurality of application icons for a user to make a section if the communication device receives a ringback tone from the called party;
    running a selected application;
    detecting whether the called party answers or hangs up the telephone call within a preset period after the selected application is run; and
    closing the running application if the called party answers or hangs up the telephone call within the preset period.

* * * * *